(No Model.)
J. K. ALWOOD.
HARNESS.
No. 306,991. Patented Oct. 21, 1884.
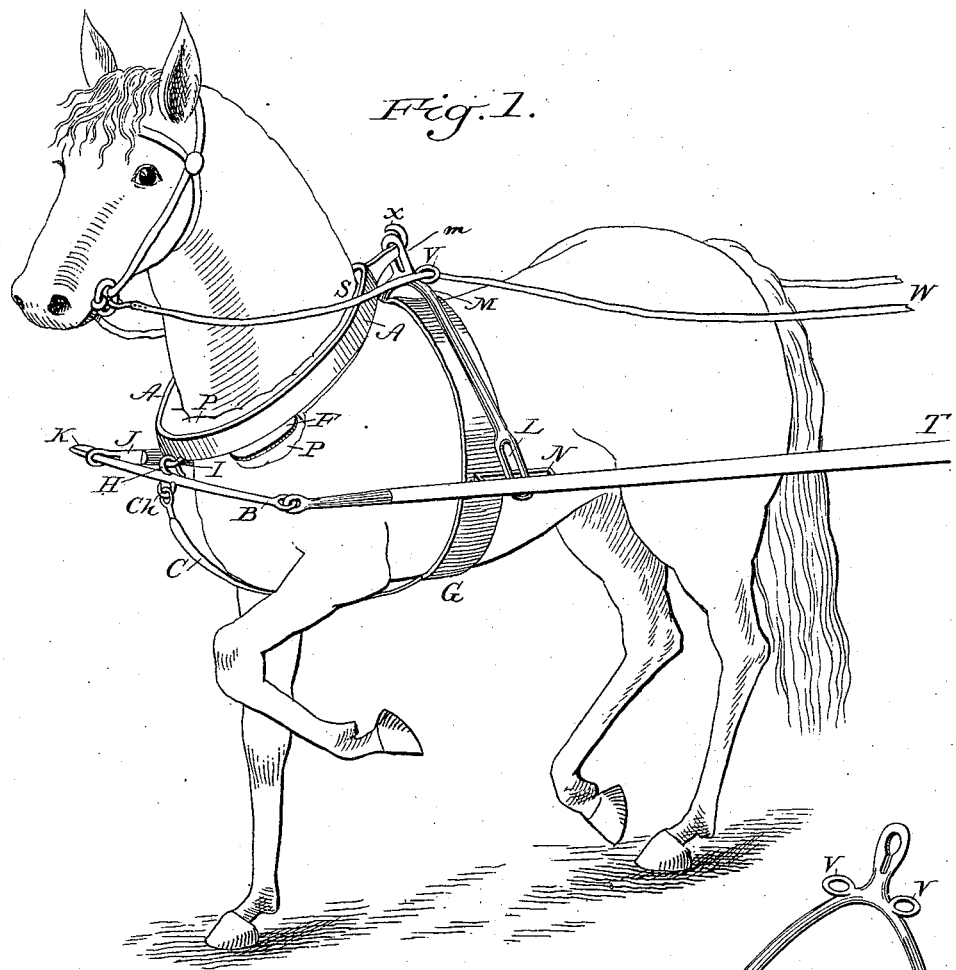
Fig. 1.
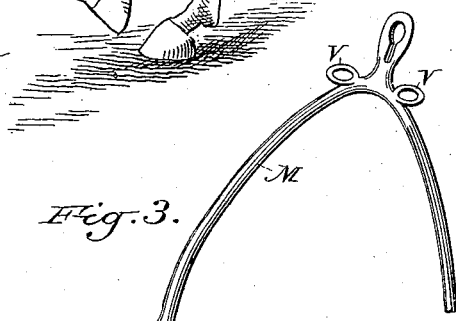
Fig. 3.
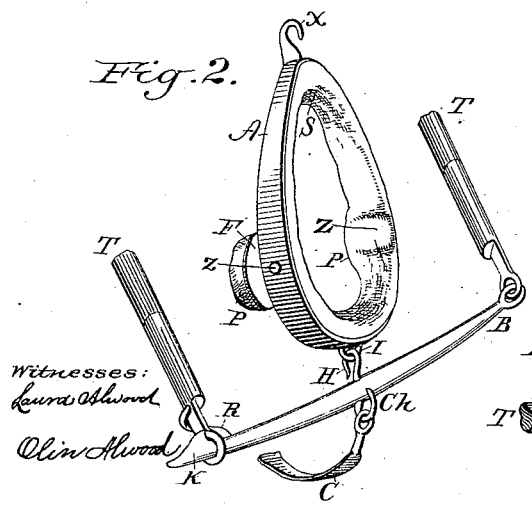
Fig. 2.
Fig. 4.
Witnesses:
Laura Alwood
Olin Alwood
Inventor:
Josiah K. Alwood

UNITED STATES PATENT OFFICE.

JOSIAH K. ALWOOD, OF MORENCI, MICHIGAN.

HARNESS.

SPECIFICATION forming part of Letters Patent No. 306,991, dated October 21, 1884.

Application filed July 19, 1884. (No model.)

*To all whom it may concern:*

Be it known that I, JOSIAH K. ALWOOD, a citizen of the United States, residing at Morenci, in the county of Lenawee and State of Michigan, have invented certain new and useful Improvements in Harness, of which the following is a specification.

My invention consists of a novel construction and arrangement of breast-bar, back-bow, and other devices, all of which will be fully understood by the following description and claims.

In the accompanying drawings, Figure 1 represents my harness in use. Fig. 2 is a detached view of the collar and breast-bar, ends of the thills, and the choker. Fig. 3 is a detached view of the back-bow, showing its attachment to the thill. Fig. 4 shows the connection of the breast-bow to the detachable thill and the key for that purpose.

In the construction of my harness very few pieces are employed, the thills and collar being connected by means of a simple breast-bar and back-bow, as shown in Fig. 1. This breast-bar has a hook, H, which is inserted into eye I of the collar. One end of the breast-bar is permanently interlinked to the end of one thill, and the other end is detachably connected to the other thill by means of a key or projection, K, and a hook or catch, R, as shown in Figs. 2 and 3.

Attached to a central staple, Ch, is a choke-strap, C, extending between the horse's fore legs, and connected with the broad girth G, Fig. 1.

The collar A, I prefer to make of metal, forming closed hames. It is provided with pads P, flanges or projections F, supporting-strap or saddle S, and a hook, X, which last receives the central loop of the back-bow M. This bow is provided with rings V for the reins W, and is to be connected to the thills by means of slots L, staples N, and adjustable pins Y, as seen in Fig. 3. The pads P have small notches or depressions Z, to allow the collar to pass the horse's eyes in putting the collar on or off over the horse's head, and the saddle S is riveted to the collar on both sides at $z$, so that this saddle supports the collar or hames free from the horse's neck, and thus prevents chafing.

This construction of harness is very simple, cheap, and durable. It affords a direct line of draft from the axle or load to shoulder of the horse, thus rendering the draft lighter or easier. It is quickly adjusted, and less liable to accident than ordinary harness.

Having thus described my invention, what I claim is—

1. In a harness, the closed collar or hames A, provided with the saddle S, and means, substantially as described, for its connection with the breast-bar B, and the back-bow M, all substantially as and for the purposes set forth.

2. The breast-bar B, in combination with the thills T, the closed collar or hames A, and the choke-strap C, all constructed to operate substantially as specified.

3. In a harness, the back-bow M, provided with the central loop, $m$, for connecting said bow with hook X, and with slots L at the lower ends of said bow, for connecting the same with the thills, substantially as and for the purpose set forth.

4. In a harness, a breast-bar, B, provided with the collar or hames connection, and with a permanent hinged thill-connection at one end and a removable thill-connection at the opposite end, substantially as set forth.

JOSIAH K. ALWOOD.

Witnesses:
SARAH S. ALWOOD,
OLIN G. ALWOOD,
GEORGE S. SEIPLE.